United States Patent [19]
Ouaknine

[11] 3,800,420
[45] Apr. 2, 1974

[54] ORTHODONTIC DILATOR

[76] Inventor: Gilbert Ouaknine, 6 rue Mazzini, Narbonne (Aude), France

[22] Filed: Sept. 29, 1972

[21] Appl. No.: 293,463

[30] Foreign Application Priority Data
Oct. 5, 1971   France .............................. 71.35824

[52] U.S. Cl. ................................. 32/14 E
[51] Int. Cl. ............................... A61c 7/00
[58] Field of Search ..................... 32/14 E

[56] References Cited
UNITED STATES PATENTS
2,927,578   3/1960   Gerbrands ........................ 32/14 E

*Primary Examiner*—Robert Peshock
*Attorney, Agent, or Firm*—Roger Goudreau

[57]   ABSTRACT

The dilating device consists of an element made of two mobile parts facing each other, each part being adapted to be embedded in a block of resin shaped to the area of the palate; one part includes a driving worm with an actuating head and a threaded element located in a housing provided in the said part; the other mobile part includes a rack received in a suitably shaped cavity in the first mobile part, the cavity communicating with the housing of the driving worm; the threads of the driving worm engage with the teeth of the rack whereby rotation of the worm causes the rack to slide in the cavity and produces relative movement between the two parts either towards or away from each other.

8 Claims, 5 Drawing Figures

ORTHODONTIC DILATOR

The invention relates to an orthodontic dilating device for the purpose of extending the palate transversely.

Known dilating devices consist substantially of two parts mobile in relation to each other which, prior to being placed in position in the palate, are embedded in resin blocks shaped to provide adequate anchorage on each side of the palate. These parts may be displaced in relation to each other by means of a threaded shaft running in a tapped hole in each part; in order to produce this displacement, the dentist rotates the shaft by introducing a small rod into holes arranged in the central portion thereof.

This type of dilator has disadvantages, the most apparent of which are the following.

In the first place, the threaded shaft in the patient's mouth is often rotated inadvertently, either by accident or by the patient's tongue which is irritated to a greater or lesser degree by the presence of the device. In order to prevent this rotation, which nullifies the effect of the device, dentists usually lock the threaded shaft by means of a piece of locking wire. This wire, however, is difficult to install and it causes a considerable loss of time whenever the shaft is adjusted.

Moreover, this threaded shaft does not satisfactorily locate the two parts of the dilator in relation to each other, especially when the dilator is almost at the end of its travel; the manufacturers have therefore been obliged to equip the device with lateral guide rods which pass through the two parts of the dilator and thus improve, to some extent, the stability of the parts. However, apart from the fact that these guides are not completely satisfactory when the dilator is almost at the end of its travel, they produce a substantial increase in the cost price of the device.

Other devices have been conceived to overcome these defects but, since they produced still more serious defects when they were used, they have been abandoned. Such devices consist of a metal strip designed to be partly embedded in a block of resin and to be introduced in a sleeve embedded in another block of resin. The part of the strip accommodated in the sleeve has teeth engaging with a toothed wheel or similar component which can be actuated by the dentist to move the strip means are provided to lock and unlock the toothed wheel; apart from its complexity, which makes it expensive and extremely delicate to produce, a device of this kind has several disadvantages which make it impractical. One serious disadvantage is that each time the device requires adjusting in order to extend the palate, the dentist has to unlock the drive mechanism. Since this mechanism is reversible, there is an inevitable change in the existing distance between the blocks; as a result of this, there is no specific reference position from which the new adjustment can be made, and it is therefore impossible to extend the palate by a specific amount in relation to its initial condition. It is therefore also impossible to carry out successive adjustments for the purpose of extending the palate progressively, and thus prevent lesions caused by discontinuity.

It is an object of this invention to palliate the disadvantages of conventional dilating devices and to provide an apparatus consisting of two mobile parts which are automatically locked after each adjustment and have excellent stability in relation to each other, with no necessity for guide rods, although, of course, it will always be possible to add one or more guide rods to the apparatus in order to improve this stability still further.

According to the invention, one of the mobile parts consists of a driving worm comprising an actuating head and a threaded element located in a housing in the mobile part and running substantially following the common axis of the two parts, in a manner such that its threads run substantially in transverse planes, while the other mobile part is provided with a rack, the axis of which is parallel with that of the driving worm while the transverse teeth thereof match the threads of the worm, the rack being introduced into a suitably shaped cavity in the first part, the cavity communicating with the housing of the driving worm, the threads of which engage with the teeth of the rack in a manner such that rotation of the worm causes the rack to slide in its cavity and thus produces relative motion between the two mobile parts, either towards or away from each other.

A rack of this kind engaging with the threads of a worm constitutes a non-reversible mechanism; although the rack may be moved by rotating the worm, it is strictly impossible to reverse this movement, regardless of the force applied to the rack. More particularly, no reaction of the palate can cause the worm to rotate, the worm being completely locked by the teeth of the rack. This is a well-known property of worm drives. The parts of the apparatus may therefore be moved towards or away from each other merely by actuating the worm, and their relative immobility is maintained as long as the worm is not actuated.

Moreover, the rack, which may be of relatively large cross-section (almost as large as that of the mobile parts), provides a rigid connection between the two parts, thus ruling out any play between them. Furthermore, the driving worm is inaccessible in its housing and cannot be rotated inadvertently. This eliminates any possibility of accidental displacement of the two parts in the longitudinal direction.

According to one preferred embodiment, the rack consists of a strip of material in which a series of parallel slots along the length thereof constitute the teeth. This rack is therefore supported on four sides in the cavity in which it is located. This guidance ensures a highly stable connection between the two parts of the apparatus.

Moreover, where the apparatus is to be used in the lower jaw, the rack may with advantage be curved longitudinally, the cavity in which it slides being curved appropriately. An apparatus of this kind may be located upright, in a natural way on the lingual part, the shape of which it follows. Its action upon the teeth is thus better distributed, more accurate, and more effective, while its shape makes it possible to locate it in narrow mouths and especially in the mouths of young children.

The actuating head of the worm may also be protected by a detachable cover placed in position before the resin is moulded around the apparatus and removed after this moulding operation, once the thin layer of resin covering the cover has been removed. This provides the dentist with easy access to the actuating head of the worm.

The pitch of the driving worm and of the teeth of the rack will preferably be between 1 and 2 millimetres. These values enable the dentist to carry out the treatment very accurately by rotating the worm by a specific amount at each session, for example a half revolution. This separates the two parts by an amount equal to half the pitch of the thread, i.e., between half millimetre and 1 millimetre.

In order to improve the anchorage of the mobile parts in their resin blocks, and to improve the distribution of the stresses transferred to these blocks, the portions of each part which face each other may be trapezoidal in shape, widening out towards the side remote from the other part. Each part may also have perforations at its periphery, to accommodate wires serving to reinforce the resin blocks.

It is also known that the parts of the dilator are embedded, for practical reasons, in a single block which is afterwards divided into two. This division may be facilitated by providing, between the two mobile parts, a cutting thread emerging laterally from the two sides of the parts; after the moudling operation, and while the resin is still plastic, this wire makes it possible to cut the resin very conveniently and very quickly.

According to another embodiment of the invention, the edge of at least one of the mobile parts, facing the other part, is provided with one or more tapped holes into which the threaded rods may be screwed making it possible to act upon an isolated tooth by means of threaded rods attached to a ring.

The invention having now been set forth in a general way, the following description, in conjunction with the attached drawings, indicates, by way of non-restrictive example, some examples of embodiment which will make it easier to understand. In these drawings.

Figure 1:
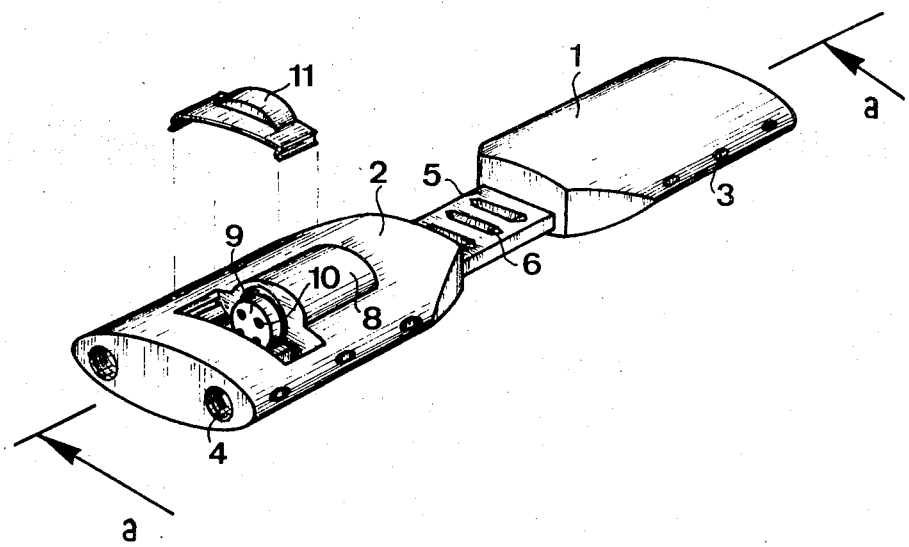
FIG. 1 is a perspective view of an apparatus made in accordance with the present invention.
Figure 2:
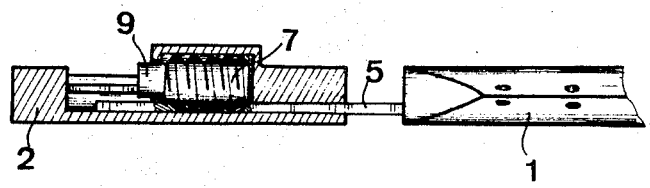
FIG. 2 is a part-section view along lines a—a in FIG. 1.

The dilator shown by way of example in FIG. 1 and 2 consists of two mobile parts 1 and 2 facing each other, each part being wider at the rear. Each of these parts contains lateral holes 3 and tapped holes 4 in their rear end-faces; the purpose of these two types of holes will be explained hereinafter.

Part 1 is integral with a rack 5 of rectangular section comprising a series of slots 6 acting as teeth; it is to be understood that these teeth may be of a different design — for instance they may be tapped into a semicylindrical channel. The rack is arranged to slide in a cavity in part 2, the slots therein being shaped and spaced to engage with the threads of a driving worm 7, the worm being accommodated in a housing 8 in part 2 and having an actuating head 9 accessible through an an aperture in part 2.

In the example illustrated, head 9 has four apertures 10 allowing it to be rotated by means of a special key. Rotation of worm 7 causes rack 5 to move in its cavity and thus to move parts 1 and 2 towards or away from each other. It is preferable for the pitch of worm 7 to be substantially equal to 1.6 millimetres, so that a half revolution of the worm produces a displacement of the rack equal to 0.8 of a millimetre. In most cases, a displacement of this magnitude will enable the dentist to combine highly effective treatment with no danger whatever of palatal lesions.

Part 2 is also provided with a cover 11 to protect actuating head 9 while the resin is being moulded.

Figure 3:
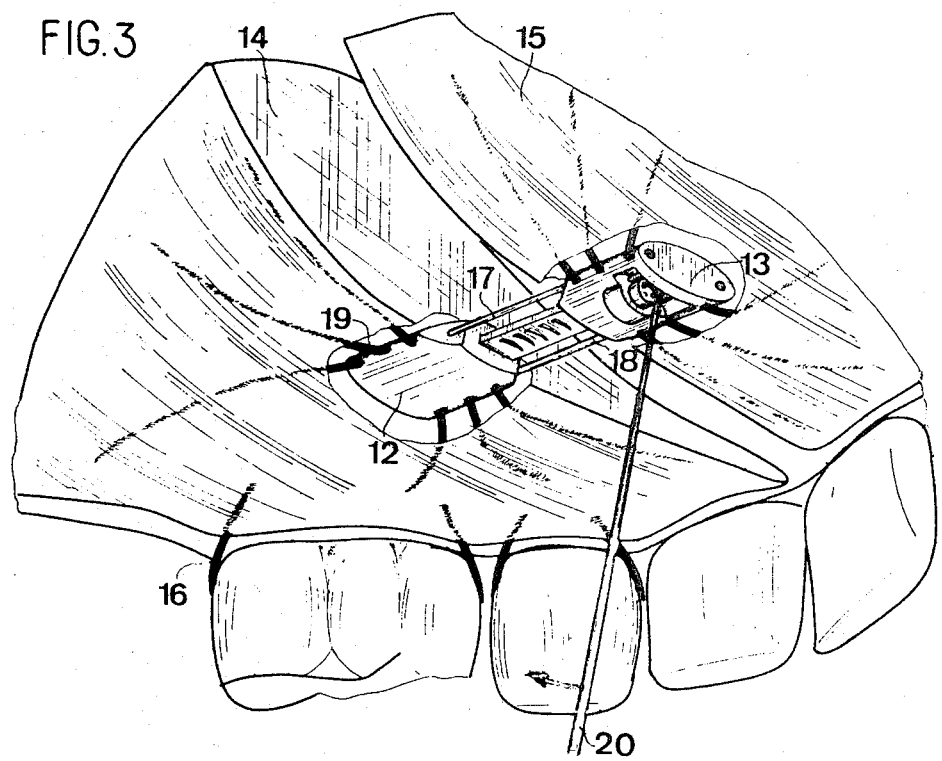
FIG. 3 is a schematic representation showing the apparatus in a position in the upper part of the patient's palate for the purpose of extending this part of the palate transversely.

FIG. 3 shows a dilator in operation, parts 12 and 13 thereof being embedded in resin blocks 14 and 15, and the blocks being fastened to the teeth by wires such as at 16. This dilator is similar to the one described above, except that two guide rods 17, 18 have been added in order to improve still further the relative stability of parts 12, 13. Reinforcing wires 19 are accommodated in lateral holes in the parts, and these improve the strength of blocks 14, 15 very considerably.

The apparatus is operated by means of a key 20, one end of which has two pips engaging in two opposing apertures in head 9.

Figure 4:
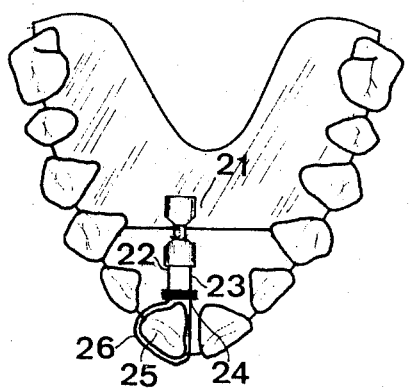
FIG. 4 is a view of the apparatus from above, being positioned to produce traction on an isolated tooth.

FIG. 4 illustrates an additional application of an apparatus 21 according to the invention. Two threaded rods 22, 23 connected to a plate 24 have been screwed into two of the holes (marked 4, FIG. 1) of the apparatus in order to exert traction on a tooth 25 enclosed in a ring 26 integral with plate 24. In this case, the rear part of the apparatus is embedded in a block of resin shaped to fit the rear part of the palate.

Figure 5:
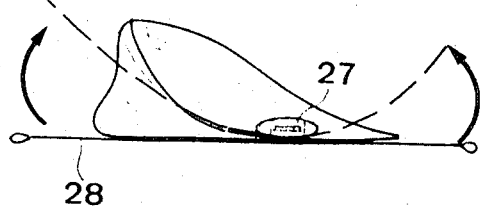
FIG. 5 is a cross-section, through a median plane, of an apparatus equipped with a cutting thread.

Apparatus 27 in FIG. 5 is equipped with a cutting thread 28 which makes it possible to separate the resin very quickly into two blocks while it is still plastic.

The dilators according to the invention may be produced in a graduated range of sizes; for instance, small models may have a maximal extension of three millimetres, while large models may have a maximal opening of about twelve millimetres. Of course, these dilators will eventually be equipped with conventional holding plates normally used with this type of apparatus.

The invention having now been set forth, is not limited in interpretation except by the scope of the following claims.

I claim:

1. An orthodontic dilating device for extending the plate transversely, comprising an element consisting of two mobile parts facing each other, each of said parts being adapted to be embedded in a block of resin shaped to the area of the palate, one of said mobile parts including a driving worm having an actuating head and a threaded element located in a housing in said mobile part and arranged to follow substantially the common axis of said two parts, the threads of said threaded element being located in substantially transverse planes; said other mobile part including a rack, the axis thereof being parallel with that of said driving worm and the transverse teeth thereof matching the teeth of said worm, said rack being received in a suitably shaped cavity in the first mobile part, said cavity communicating with the housing of said driving worm; said threads engaging with the teeth of the rack whereby rotation of said worm causes the rack to slide in said cavity and produces relative movement between said two mobile parts either towards or away from each other.

2. A dilating device according to claim 1, wherein the rack consists of a strip of material having teeth in the form of a series of parallel slots longitudinally disposed there-on.

3. A dilating device according to claim 1, wherein the head of the driving worm carries a detachable protective cap.

4. A dilating device according to claim 1, wherein the pitch of the driving worm and of the teeth in the rack is substantially between one and two millimetres.

5. A dilating device according to claim 1, wherein the portion of each mobile part facing the other part is trapezoidal in shape, widening out towards the side remote from the other part.

6. A dilating device according to claim 1, wherein the mobile parts have, at their peripheries, perforations making it possible to fit wires for the purpose of reinforcing the blocks of resin in which said parts are to be embedded.

7. A dilating device according to claim 1, further comprising, between the two mobile parts, a cutting wire projecting laterally from the two sides of said parts, said wire being of a specific length and allowing said resin to be cut after being moulded, to produce two separate blocks, in each of which one of said parts is embedded.

8. A dilating device according to claim 1, further comprising at least one threaded rod attached to a ring surrounding an isolated tooth; at least one of said mobile parts being provided, on the edge thereof remote from the other mobile part, with at least one tapped hole into which said threaded rod may be screwed.

* * * * *